Dec. 5, 1967  T. D. SHARPLES  3,355,968
INDEXING APPARATUS
Filed July 14, 1965  2 Sheets-Sheet 1
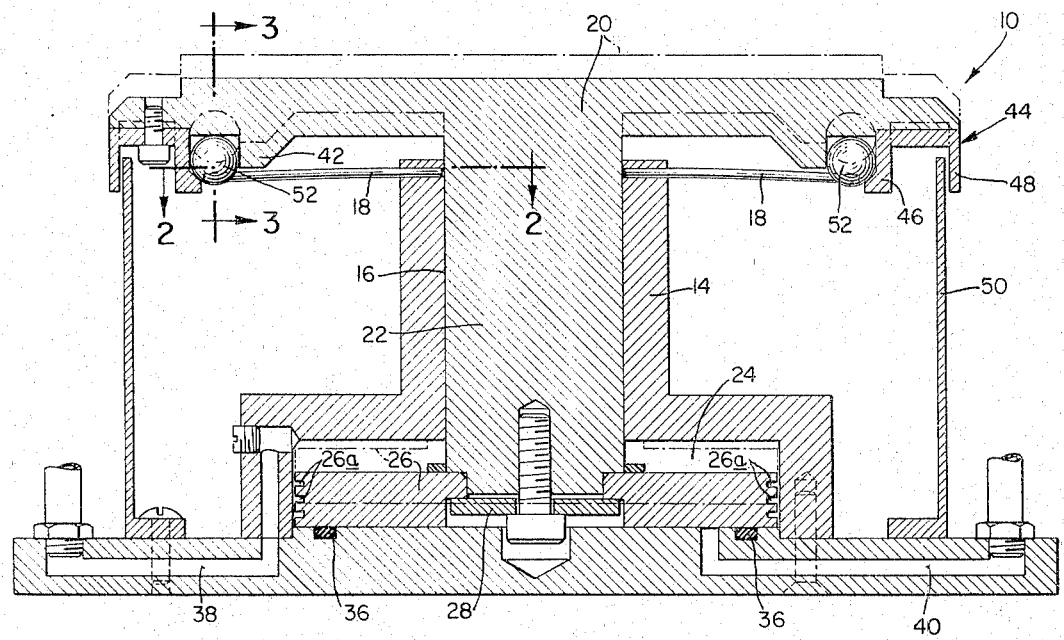
Fig. 1
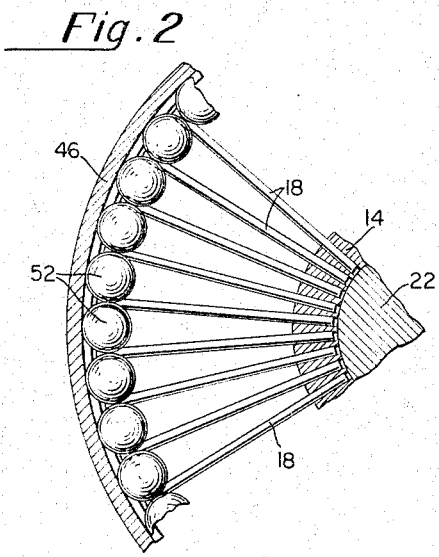
Fig. 2
Fig. 3
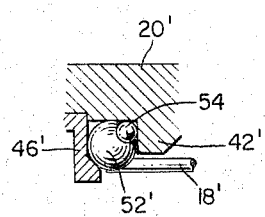
Fig. 4A
Fig. 4
INVENTOR.
THOMAS D. SHARPLES
BY Dallett Hoopes
ATTORNEY Dec. 5, 1967     T. D. SHARPLES     3,355,968

INDEXING APPARATUS

Filed July 14, 1965     2 Sheets-Sheet 2

INVENTOR.
THOMAS D. SHARPLES
BY Dallett Hoopes
ATTORNEY

United States Patent Office 3,355,968
Patented Dec. 5, 1967

3,355,968
INDEXING APPARATUS
Thomas D. Sharples, Lansdale, Pa., assignor to Pennsalt Chemicals Corporation, Philadelphia, Pa., a corporation of Pennsylvania
Filed July 14, 1965, Ser. No. 471,915
3 Claims. (Cl. 74—826)

ABSTRACT OF THE DISCLOSURE

Indexing is accomplished with apparatus comprising two relatively rotatable frames held together, one frame having an annular row of balls, the other frame having a row of resilient fingers extending radially outward from the axis of rotation with the free ends thereof cooperating in interleaved relationship with the balls so as to establish selectively one of a plurality of accurately equispaced relative position of the frames, and further including fluid motor means for effecting relative rotation between the frames.

The present invention relates to a measuring or indexing mechanism of great accuracy. It may be of the type in which a workpiece is supported on the mechanism and may be rotated angularly a preset amount between, for instance, adjacent cuts. This type of indexing mechanism in the art is known as an indexing plate or table since it includes a workpiece-conveying rotary plate or table mounted in turret fashion on a stationary base. Alternatively the invention may be embodied in a linear comparator and linear related equipment.

The indexing mechanism of the invention may be of the general type described in the U.S. Patent 3,091,134 which issued May 28, 1963. In the prior devices positive rotary positioning has been achieved by the use of two annular rows of hard metal balls: one row mounted on the stationary base, the other on the underside of the indexing table. To position the table accurately with respect to the base the table is lowered so that the annular row of balls on its underside nests into the row of balls on the stationary base. In this fashion generally speaking there are just as many annular settings of the indexing table as there are balls in each row.

By the use of ordinary ball bearings as indicated accuracy is achieved in prior devices. Ball bearing balls, for instance, are within 1/100,000 of a given size and it will be understood that when a number of such balls in cooperating rows are brought together tiny out-of-roundnesses on some of the balls will be cancelled out by opposing out-of-roundnesses on other balls so that the net effect is accuracy of a very high degree in the relative positioning.

While the prior devices are comparatively inexpensive and accurate, they are subject to a number of disadvantages. One very significant criticism is that if a chip of relatively hard material finds its way between the rows of balls and comes to rest on one of the balls in an area where it is to engaged by a ball in the other row, the annular setting of the indexing table is afflicted with considerable inaccuracy. It will be understood that because the balls are rigidly mounted in their rows a rigid chip disposed between the two rows will throw off the annular setting by at least the width of the chip. In high precision work this cannot be tolerated. Another criticism of the patented devices is that the presence of a chip between the rows of balls will cause the upward cocking of the table on the side of the chip with a resulting tendency to jam and wear the central bearing. A further drawback is that in the prior devices the balls are used for indexing as well as providing tangential locking. It follows that tangential forces not only tend to rotate the table but also tend through cam action of the ball assembly to lift the table, an action which can cause wearing of the balls and ultimate inaccuracies.

The present invention does not carry the criticisms indicated above. Further, the simple arrangement of apparatus embodying the present invention is considerably less expensive than the structures of the prior devices and achieves the improved accuracy as the prior devices when the prior devices are operated under their best conditions.

It is, therefore, an object of the present invention to provide in an indexing mechanism a structure which will maintain its high accuracy despite the intrusion into the indexing means of foreign particles.

It is a further object of the present invention to provide an indexing mechanism which can accommodate shock loads without tipping of the indexing table and consequent binding of the central bearing.

A still further object of this invention is to present an accurate indexing device which is simpler and less expensive in construction than prior devices.

Other objects of the invention will become apparent from a reading of the following specification and the drawings which describe and show preferred embodiments of the invention and in which:

FIGURE 1 is a sectional view showing a rotary indexing mechanism embodying the invention. Alternate positions are shown in the figure: the full line position shows the indexing elements engaged while the dotted line position shows them disengaged;

FIGURE 2 is a slightly enlarged fragmentary sectional view taken on the line 2—2 of FIGURE 1;

FIGURE 3 is a fragmentary sectional view taken on the line 3—3 of FIGURE 1;

FIGURE 4 shows an alternate form of arrangement of the indexing elements embodying the invention;

FIGURE 4A is a sectional view taken on the line 4A—4A of FIGURE 4;

Figure 5:
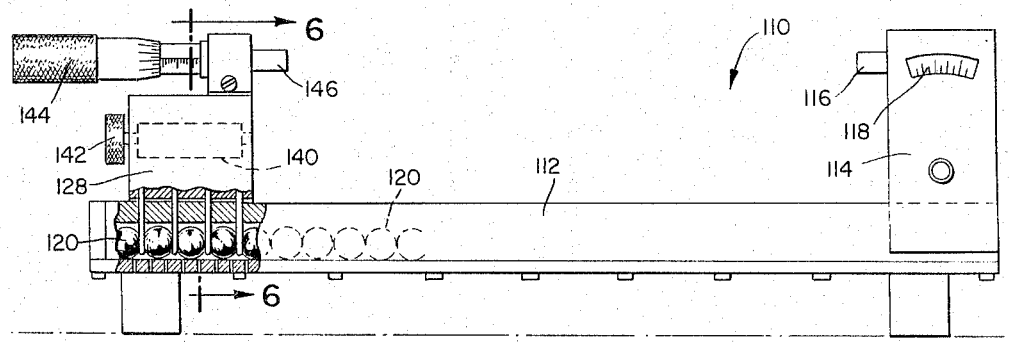
FIGURE 5 is a front view of another form of apparatus embodying the invention.

Briefly, the invention involves for indexing or measuring the cooperation of a row of balls and a row of resilient fingers, the two rows being mounted on relatively movable frames provided with means to hold the frames toward each other whereby the rows of balls and fingers are interleaved to establish selectively one of a plurality of accurately equispaced relative positions of the frames.

Referring more specifically to the drawings, an indexing mechanism embodying the invention is shown in section in FIGURE 1 and generally designated 10. It comprises a stationary base to which is secured an upstanding central hub 14. The hub 14 is provided with an axial bore 16. Adjacent its upper end the hub 14 is formed with a plurality of uniformly spaced radial holes into which are secured (FIG. 2) respectively a plurality of resilient wire spoke-like elements or fingers 18. These elements are of uniform length and radiate outward in spoke fashion from the hub.

The apparatus shown also comprises a workpiece-supporting platform 20 to the upper flat surface of which may be secured a workpiece (not shown). Extending downward centrally of the platform 20 is a boss 22 which is rotatably received into the axial bore 16. The lower end of the boss is disposed in a cylinder cavity or chamber 24 defined by the lower end of the hub 14 and the stationary base. Secured to the lower end of the boss 22 is a piston 26 with two working faces. Illustratively the piston may be secured to the boss 16 by means of a washer 28 engaging the underside of the piston and secured to the boss 22 by a machine bolt. The periphery of the piston may be formed with annular outwardly facing grooves 26a to enhance the sealing between the piston and the adjacent side wall of the cylinder chamber 24. The upper surface of the piston may be provided with a washer of polytetrafluoroethylene or similar durable resilient material to serve as a cushion for the piston on its upward stroke.

Within the chamber 24 the stationary base is formed with an annular groove facing upwardly which receives an O-ring 36 which when engaged by the undersurface of the piston forms a seal so that a positive mechanical seal about the periphery of the piston is not necessary. Such a positive seal would cause friction and impair the accuracy of the indexing mechanism. As shown, air pressure passages 38 and 40 lead from the outside of the unit to the opposite ends of the cylinder chamber and supply clamp and release pressure, respectively.

Referring now to the underside of the platform 20 (FIG. 1), an annular shoulder 42 concentric with the axis of the boss 22 and hub 14 extend downwardly. An annular ball clamping ring 44 is formed with an inwardly downwardly extending flange 46 which is enlarged on its distal end and comprises ball holding means. An outer flange 48 on the outside of the ring cooperates with an apron 50 to keep dust and dirt from intruding into the mechanism.

The annular shoulder 42 and the flange 46 present a downwardly facing channel or pocket which clampingly receives hard metal ball elements 52 of the ball bearing type. The balls are precisely arranged within the pocket and held by the clamping ring 44 so that the balls are equispaced. The dimension of the channel is such that it will accommodate the same number of balls as there are spoke-like elements 18. Appropriate means for securing the balls in proper position is disclosed in the art.

It will be apparent from a study of FIGURE 3 that when the clamping fluid of the fluid motor comprising chamber 24 and the piston 26 is activated the platform 20 will be drawn down so that the balls 52 engage between the spoke-like elements 18. Preferably when the platform is in the down position the balls assert sufficient force on the elements 18 to flex them as shown in the lefthand side of FIGURE 1. This engagement is sufficient to lock positively the platform from turning while the clamping fluid, preferably air, is supplied.

If it is desired that even greater positive locking action be provided, spacer elements can be inserted between the adjacent balls in the downwardly facing channel. These spacer elements can be in the form of metal plates of precisely the same thickness and sandwiched between adjacent balls. As shown in FIGURE 4 a convenient and accurate form of spacing elements, however, may comprise conventional balls 54 of substantially the same accuracy as the balls 52'. It will be apparent that because the spacing balls 54 are of a lesser diameter than the indexing balls 52', the two sets of balls will not both have their centers on the same circle (FIG. 4A). In these figures the fingers are designated 18' and the platform is designated 20'. The flange is designated 42' and the ring 46'.

From the above description the operation of the indexing mechanism shown will be readily understandable. Clamping air is simply applied to passage 38 to drive down the platform so that the distal ends of the spoke-like elements and the ball elements interfit to provide precise positioning. After the layout or work at this position has been accomplished, the clamping air may be released and the platform may be driven up by release air through passage 40. Alternatively, of course, the platform may be returned to upper position by a spring or an equivalent device. At any rate it is felt that the fluid motor means shown illustratively provide a more accurate means for engaging the index mechanism in the proper position.

The disadvantages of the earlier devices are not manifest in the present invention. For instance, should a foreign body of relative hardness find its way between engaging ball and spoke-like element 18, a single spoke-like element will flex laterally in opposition to opposed lateral flexing of the other spoke-like elements. The net effect on the indexing will be to throw it off only by 1/n amount where n equals the number of spoke-like elements. At the same time another advantage accrues: because the misguided spoke-like element is flexible there is no tendency for it to exert an undue jamming or cocking effect on the platform table as there would be with two sets of rigid balls engaging. This will reduce wear on the engaging surfaces of the axial bore 16 and the boss 22. Similarly because the spoke-like elements are resilient, they do not exert so great a camming effect on the platform as the platform is turned as would be the case with rigid balls mating with rigid balls. Additionally there is the added advantage of course that the structure of the present invention is much simpler than the prior devices in which it has been necessary to accurately install two rather than one set of rigid balls.

Figures 6, 7:
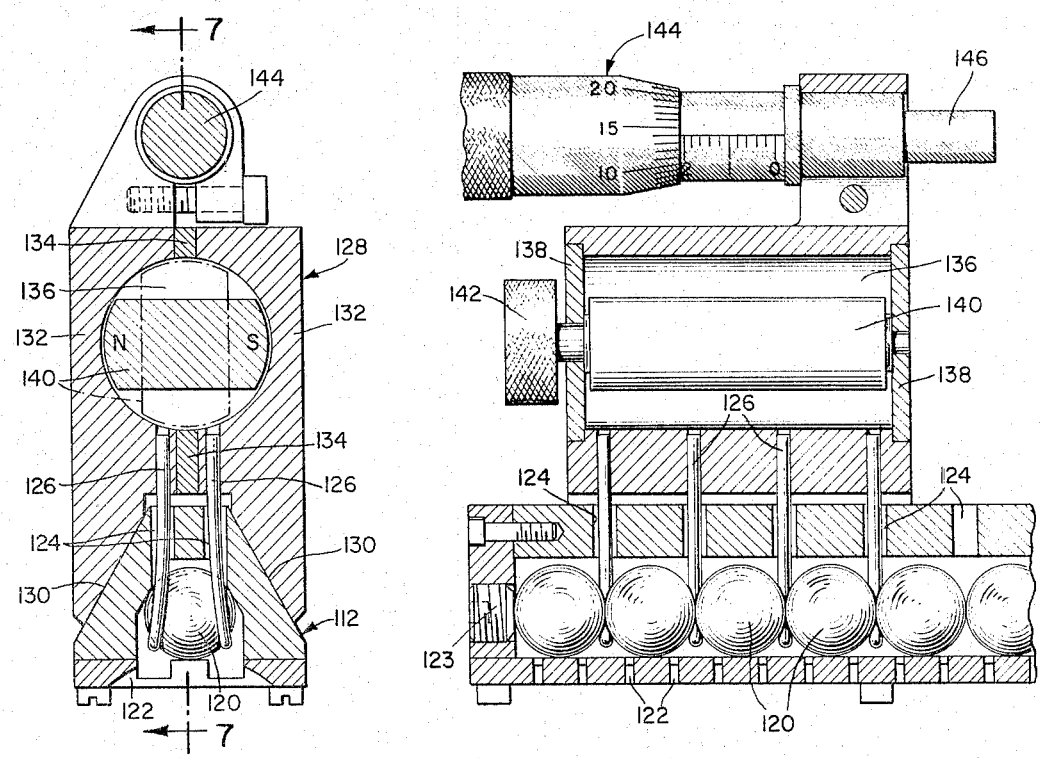
FIGURE 6 is an enlarged sectional view taken on the line 6—6 of FIGURE 5.
FIGURE 7 is a sectional view taken on the line 7—7 of FIGURE 6.

The adaptation of the invention to a device for measuring linear distances or accomplishing linear indexing is disclosed in FIGURES 5 through 7. In this embodiment of the invention the apparatus which is generally designated 110 presents a bed 112 at one end of which is provided a fixed head 114 having an abutment 116, pressure against which is reflected on an indicator 118. The bed 112 which is triangular in profile (FIG. 6) houses balls 120 arranged in a row and resting against the inside surface of the bed, the upper wall of the balls being urged upwardly by the slotted sections 122 of the lower wall of the bed. The balls may be brought together by set screw 123 so that adjacent balls touch each other.

Generally aligned with the points at which the adjacent balls touch are a series of pairs of apertures 124 disposed in the upper portion of the bed. These openings are ample to receive spring fingers or resilient rod elements 126 mounted on a carriage 128. As shown in FIGURE 6 the carriage 128 is formed with opposed angular faces 130 which engage the upper sides of the bed 112. The carriage comprises a pair of iron or steel body elements 132 between which is disposed a non-magnetic spacer 134 which may be brass. As shown in FIGURES 6 and 7 the underside of the body elements may be proveded with a series of openings which receive the fingers 128 and which are generally spaced the same distance as the openings 124 in the bed.

Centrally the carriage provides an axial opening 136 which is covered with a pair of end walls 138 having openings in which is journaled a magnet 140. The magnet is adapted to be rotated in these journals by a control knob 142 and to be fixed in either of two positions shown in full line and phantom respectively in FIGURE 6. When the magnet is rotated to the full line position shown in FIGURE 6, the iron body members 132 comprise extensions of the poles of the magnet and they clamp the carriage magnetically to the bed 112. Rotation to this position is of course accomplished after the position of the carriage on the bed has been established by the fingers extending through the openings 124 and interfitting between the touchings balls.

The clamping action of the carriage on the bed may be simple released by rotating the magnet 140 90° so that it assumes the dotted line position shown in FIGURE 6. In this position the magnetic flux is distributed equally over the body portions 132 to yield no net effect of magnetism of the carriage on the bed 112.

Mounted on the top of the carriage in a suitable clamp is the measuring portion of a micrometer 144 having the spindle 146.

In operation the object to be measured is set against the abutment 116 so that the indicator 118 reads at the desired figure. With the magnet in the vertical position shown in the dotted line in FIGURE 6 the carriage 128 is plugged into the bed as close to the opposite side of the object as possible. With the angular faces 130 of the carriage against the faces of the bed 112 the magnet is rotated to the full line position shown in FIGURE 6 to magnetically clamp the carriage to the bed. The micrometer 144 is then advanced until the spindle 146 engages the object to be measured. This measurement read with the index mark on the bed 112 which registers with an index mark on the carriage accurately provides the dimension of the object.

Other variations of the linear measuring device shown in FIGURES 5, 6 and 7 are envisioned. For instance the carriage 130 may actually support a workpiece and the carriage may be moved along the bed 112 as desired and operations performed on the workpiece at the equispaced intervals. In another embodiment the carriage 128 may ride on a track above the bed 112 and the bed be brought up to the carriage for locking. In still another embodiment the carriage may slide on a track parallel to and adjacent the row of balls, and the fingers, mounted on the carriage, may be pivoted over to interleave the balls. The preferred linear embodiment, however, is as shown in FIGURES 5, 6 and 7.

As indicated, the balls in all embodiments of the invention may be conventional ball bearing balls. The fingers, or wire spoke-like elements, may be selected from a number of different relatively resilient rod stocks. A very suitable stock has been found to be ⅛ inch standard drill blanks. These are inexpensive and readily available.

The present invention may be embodied in other specific forms without departing from the spirit or central attributes thereof and, accordingly, reference should be made to the appended claims rather than the foregoing specifications as indicating the scope of the invention.

I claim:
1. An indexing mechanism comprising a stationary base, a hub mounted on the stationary base for rotation about an axis and having a central axial opening, a plurality of resilient equispaced spoke-like elements radiating outward from the hub in radial direction relative to said axis and having their outer ends free, a workpiece-supporting platform having a central downward boss extending rotatingly into the central opening, an annular row of hard balls held on the underside of the platform concentrically about the axis of the hub and spaced angularly about the axis to the same degree as the spoke-like elements, and fluid motor means for driving the platform axially relative to the hub from a first position wherein the balls are not in engagement with the spoke-like element to a second position wherein the balls are in engagement with the spoke-like elements.

2. An indexing mechanism as described in claim 1 wherein the fluid motor means comprises a double-faced piston attached to the boss and a closed cylinder fixedly disposed in the stationary base and wherein the seal between the piston and the cylinder is of the low-friction type.

3. A measuring device comprising a bed having a straight row of equispaced balls, a carriage adapted to be positioned along the bed, the carriage carrying a plurality of fingers spaced apart a distance approximately equal to the distance between the centers of adjacent balls, and means for selectively clamping the carriage against the frame whereby the fingers interleave the balls; said carriage carrying a micrometer and the one end of the bed carrying an abutment; said clamping means comprising selectively engageable magnetic means including a rotatable magnet, and with the carriage comprising spaced ferric body elements.

References Cited
UNITED STATES PATENTS

| | | | |
|---|---|---|---|
| 2,144,972 | 1/1939 | Hirst | 33—165 |
| 2,496,099 | 1/1950 | Leto | 33—1 |
| 2,663,082 | 12/1953 | Bauerfeld et al. | 33—19 |
| 3,177,740 | 4/1965 | Firestone et al. | 74—826 |

FRED C. MATTERN, JR., *Primary Examiner.*